Oct. 7, 1924.  
T. A. HOOVER  
AUTOMOBILE BUMPER BRACKET  
Filed Nov. 5, 1923  
1,510,992
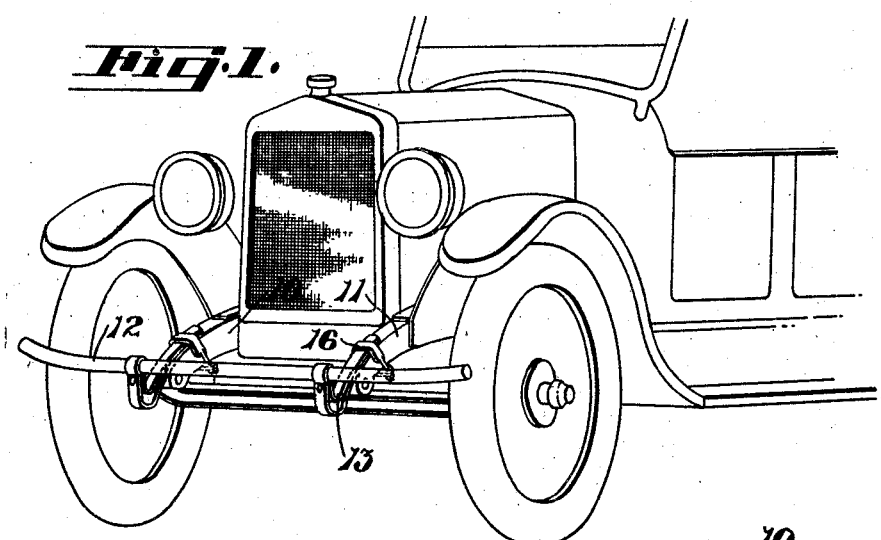
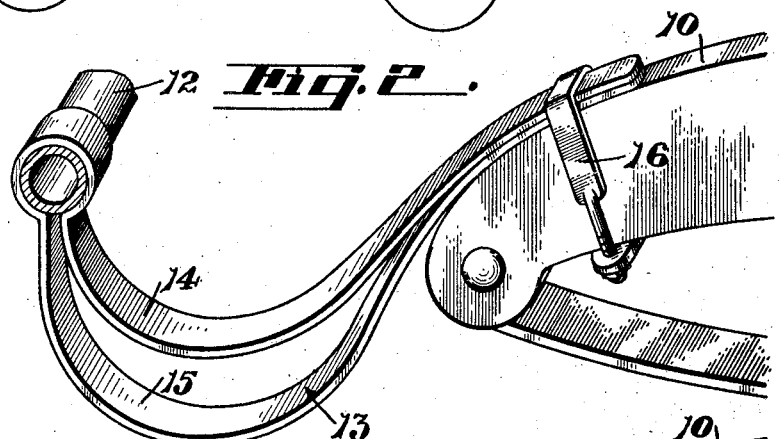
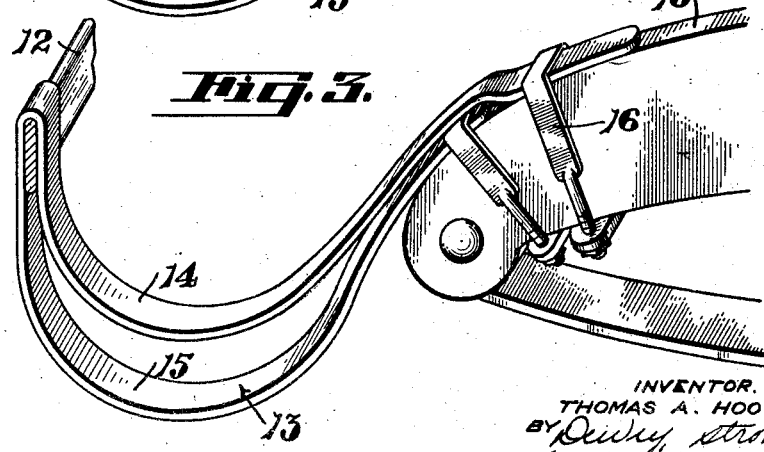
INVENTOR.  
THOMAS A. HOOVER.  
BY  
ATTORNEYS.

Patented Oct. 7, 1924.

1,510,992

UNITED STATES PATENT OFFICE.

THOMAS A. HOOVER, OF FRESNO, CALIFORNIA, ASSIGNOR TO AMERICAN CHAIN COMPANY, INCORPORATED, OF BRIDGEPORT, CONNECTICUT, A CORPORATION OF NEW YORK.

AUTOMOBILE BUMPER BRACKET.

Application filed November 5, 1923. Serial No. 672,774.

*To all whom it may concern:*

Be it known that I, THOMAS A. HOOVER, a citizen of the United States, residing at Fresno, county of Fresno, and State of California, have invented new and useful Improvements in Automobile Bumper Brackets, of which the following is a specification.

This invention relates to automobile bumpers and particularly pertains to a bracket therefor.

It is the principal object of the present invention to provide a mounting for automobile bumpers of the free end type such as rigid bar or spring bar bumpers which will afford a convenient mounting for the bumper and at the same time will provide a resilient support by which impact shock delivered to the bumper may be gradually absorbed and the possible damage to the car greatly reduced.

The present invention contemplates the use of a spring bumper bracket comprising a plurality of spring loops which cooperate in absorbing the force of a blow delivered to any part of a bumper bar supported thereby, the bracket being looped over the bar and having its two terminating ends secured to the frame of the car.

The invention is illustrated by way of example in the accompanying drawings in which:

Fig. 1 is a view in perspective showing the front of an automobile with the bumper with which the present invention is concerned mounted thereon.

Fig. 2 is a view in side elevation showing one form of the bumper bracket as adapted to a round bar bumper.

Fig. 3 is an enlarged view in side elevation showing the bracket adapted for use with a bumper of the spring bar type.

Referring more particularly to the drawings 10 and 11 indicate the frame horns of an automobile in advance of which a bumper bar 12 is disposed. This bar extends transversely of the frame and has ends terminating at points which cause the bumper to tend to protect the fenders of the vehicle. The bumper 12 is secured to the frame by brackets 13. These brackets are formed of flat spring metal providing two leaves 14 and 15. The leaves are in the shape of loops nested one within the other. From the standpoint of economy it is desirable to make the entire bracket in one piece, and to bring it around the bumper bar in a manner to hold the bar and at the same time to dispose the looped portions of the leaves in spaced relation to each other to permit independent flexure of the two leaves without interference one with the other.

At the present time a type of bumper bracket has been made embodying the use of a U-shaped flat spring mounting, but these mounting have been inadequate to absorb the blows which have been delivered to the bumper bars and have thus permitted the bars to transmit the shock directly against the frame when the brackets have bent or broken under the excessive strain. With the present device minor shock imparted to the bars will be readily accommodated due to the curved shape of the brackets and when excessive shocks are delivered the two leaves of each bracket will cooperate in resisting this shock and lengthening the interval during which the shock is transmitted to the vehicle frame. This will, of course, minimize the objectionable force received by the frame. The spring leaves 14 and 15 of each bracket are disposed in the same vertical plane and their terminating ends lie flat one upon the other as positioned upon the upper face of the frame horn. These ends are then clamped down upon the frame horn by U-bolts 16 which embrace the horn and ends. As shown in Figs. 1 and 2 of the drawings, but one bolt is provided for each bracket, although it will be understood that additional fastening might be utilized if desired. In practice, however, the use of one bolt has been found advantageous as it has permitted a slight swerving of the bumper when excessive shocks have been delivered to the bumper from either side of the longitudinal center of the car. The form of the invention shown in Fig. 3 provides separate fastening means for the ends of each of the bracket leaves, and thus gives a slightly longer spring action on the upper leaf and similar independent flexing of the upper leaf before striking the lower leaf.

In operation of the present invention the bumper may be mounted by the brackets as shown in the drawings. Under minor shock the brackets will absorb the shock by a slight deflection, but when an excessive collision force is delivered to the bumper the leaves 14 and 15 will combine to yieldingly resist the shock while tending to bring the vehicle to rest and at the same time absorbing the major portion of the shock.

While I have shown the preferred form of my invention as now known to me, it will be understood that various changes might be made in the combination, construction and arrangement of parts by those skilled in the art, without departing from the spirit of the invention as claimed.

Having thus described my invention what I claim and desire to secure by Letters Patent is:

1. A bracket for automobile bumpers comprising a plurality of spring loops made of flat strips of metal and nested one within the other, the loop portions being spaced from each other, a bumper bar secured to the outer converging ends of the loops and fastening means for clamping the inner converging ends of the loops to the frame of an automobile, said fastening means comprising a single clip embracing the ends of the loops and the frame.

2. A bracket for automobile bumpers comprising a flat strip of resilient material bent upon itself to form a pair of arcuate loops, the connecting end portions of the loops embracing a bumper bar and the free ends of the loops being fastened one upon the other to the frame of the automobile.

3. A bracket for automobile bumpers comprising a flat strip of resilient material bent upon itself to form a pair of arcuate loops, the connecting end portions of the loops embracing a bumper bar and the free ends of the loops being fastened one upon the other to the frame of the automobile, a substantially crescent-shaped space being formed between the loops.

4. A bracket for automobiles comprising a pair of spring leaves formed of flat material and set on arcs of different radii, whereby the ends of said springs will substantially converge while forming a crescent shaped space between said springs, a bumper secured to the forward converging ends of said leaves, and means at the rear converging ends for securing said leaves to the horn of an automobile.

5. In combination with the curved frame horn of an automobile, a spring bracket adapted to be positioned thereover and secured thereto, said bracket being formed of two leaves of flat material disposed one above the other, the lowermost leaf having a rear portion conforming to the upper curved face of the frame horn and resting thereagainst, and the upper of said leaves having a rear portion substantially conforming to the upper face of the lower leaf, the forward end portions of said leaves being looped on the arcs of different radii whereby a substantially crescent shaped space will be formed between the leaves and the forward ends of the leaves will converge, a bumper bar secured to said forward converging ends of the leaves upon the horn.

THOMAS A. HOOVER.